United States Patent [19]

Reddy

[11] Patent Number: 5,345,076
[45] Date of Patent: Sep. 6, 1994

[54] OPTICALLY TRIMMED SENSOR FOR REDUCING INFLUENCE OF DIFFERENTIAL NODE LOSSES

[75] Inventor: Mahesh C. Reddy, Renton, Wash.

[73] Assignee: The Boeing Company, Seattle, Wash.

[21] Appl. No.: 788,521

[22] Filed: Nov. 6, 1991

[51] Int. Cl.$^5$ ............................................. G01D 5/34
[52] U.S. Cl. ............................. 250/231.13; 250/226; 250/227.23
[58] Field of Search ................. 250/231.13, 231.14, 250/231.16, 226, 227.23, 237 G, 227.18; 356/375

[56] References Cited

U.S. PATENT DOCUMENTS

| | | | |
|---|---|---|---|
| 3,983,391 | 9/1976 | Clemons | 250/237 |
| 4,091,280 | 5/1978 | Ellis et al. | 250/231 |
| 4,184,071 | 1/1980 | Fryer et al. | 250/231 |
| 4,281,245 | 7/1981 | Brogardh et al. | 250/227.23 |
| 4,378,496 | 3/1983 | Brogardh et al. | 250/227.23 |
| 4,417,140 | 11/1983 | Adolfsson et al. | 250/227.23 |
| 4,461,083 | 7/1984 | Ernst | 33/125 |
| 4,476,457 | 10/1984 | Kondo | 340/347 |
| 4,498,004 | 2/1985 | Adolfsson et al. | 250/227.23 |
| 4,514,860 | 4/1985 | Adolfsson et al. | 250/227.23 |
| 4,647,769 | 3/1987 | Stone et al. | 250/231 |
| 4,652,747 | 3/1987 | Ellis | 250/231 |
| 4,670,649 | 6/1987 | Senior et al. | 250/227.23 |
| 4,672,201 | 6/1987 | Welker | 250/231 |
| 4,718,879 | 1/1988 | Wada | 464/185 |
| 4,733,071 | 3/1988 | Tokunaga | 250/231 |
| 4,849,624 | 7/1989 | Huggins et al. | 250/226 |
| 4,908,510 | 3/1990 | Huggins | 250/231.13 |
| 5,068,528 | 11/1991 | Miller et al. | 250/231 |
| 5,223,708 | 6/1993 | Van Deventer | 250/227.23 |

*Primary Examiner*—David C. Nelms
*Assistant Examiner*—Stepnone B. Allen
*Attorney, Agent, or Firm*—Christensen, O'Connor Johnson & Kindness

[57] ABSTRACT

A technique is disclosed for optically trimming a sensor (10) to account for manufacturing variations in the losses of the sensor. As a result, the sensor can be used interchangeably, without requiring adjustment of the processing system (12) the sensor is used with. More particularly, in one embodiment, variably transmissive optical filters 72 and 74 are positioned inside the sensor to effectively alter or standardize the losses of the sensor. Various other arrangements, including the use of variably reflective mirrors, wavelength selective elements, blocking elements, and path adjustment elements, are also described in which the characteristics of the sensor's optical paths are altered.

27 Claims, 9 Drawing Sheets

OPTICALLY TRIMMED SENSOR FOR REDUCING INFLUENCE OF DIFFERENTIAL NODE LOSSES

FIELD OF THE INVENTION

This invention relates generally to sensors and, more particularly, to optical sensors.

BACKGROUND OF THE INVENTION

Sensors are used to monitor parameters of interest in a variety of different applications. For example, in avionic applications, the parameter of interest may be the position of an aircraft's landing gear, flaps, or ailerons. Alternatively, the parameter of interest may be the temperature, pressure, or flow rate of some fluid involved in an industrial process. In a medical application, the parameter of interest may be a patient's temperature, pulse rate, or blood pressure.

Regardless of the application involved, a sensor produces an output that is representative of the parameter of interest. In one class of sensors, referred to herein as optical sensors, the sensor output is based at least partially upon the processing of an optical beam.

More particularly, in a "passive" optical sensor, the sensor modulates an optical input beam to produce an optical output beam that is representative of the parameter of interest. A "hybrid" optical sensor, on the other hand, receives an electrical input signal and produces an optical output beam that is representative of the parameter, or receives an optical input beam and produces an electrical output signal representative of the parameter. Finally, a "self-generating" optical sensor produces an optical output beam in direct response to the parameter, without receiving either an optical or electrical input.

Optical sensors have several advantages over more traditional electrical sensors. For example, the optical beams employed by such sensors are typically not disrupted by electromagnetic fields. Optical sensors are also preferred for use in flammable environments because of their reduced risk of sparking or heating. Further, optical sensors are often relatively compact and lightweight.

Conventional optical sensors do, however, have some limitations. In that regard, the losses involved in the transmission of optical beams used by such a sensor may significantly affect the interpretation of the sensor's output. As will be appreciated, external losses may occur as the result of the absorptive, reflective, and refractive nature of the components used to transmit optical beams to and from the sensor. Similarly, internal losses may be introduced by the components that transmit optical beams within the sensor.

In the past, attempts have been made to limit the influence that optical losses have on the operation of optical sensors. For example, one approach that has been used involves the measurement of the internal losses associated with a particular sensor and the external losses associated with the system the sensor is used in. The measured optical losses are then taken into account when the sensor output is interpreted.

In that regard, the measured losses alter the relationship that would otherwise exist between the sensor output and the parameter of interest. Thus, if the sensor output is normally applied to an equation to compute, for example, the position of an object, the equation must be altered to account for the measured losses. Similarly, if a look-up table is used to determine the position of the object corresponding to a particular sensor output, the look-up table must be altered to account for the losses.

Along with the initial calibration of the sensor and system, another approach has been developed to remove the influence of losses on the sensor's output, without requiring the losses to be measured. More particularly, an optical beam including components having more than one wavelength is transmitted through the elements whose losses are to be accounted for. As will be appreciated, the losses associated with these elements, which form a common path for the beam, affect each of the different wavelength components the same. For that reason, these losses are referred to as "common-mode" losses.

After traversing the common path elements, the beam is split into its different wavelength components. One of the wavelength components is not modulated and is used as a reference. The sensor typically modulates the remaining wavelength components, however, to include information representative of the parameter of interest.

Thus, each modulated wavelength component is proportional to the parameter of interest. Because the modulated components are subject to the common mode losses, however, the losses will also influence the determination of the parameter of interest if a modulated component is used, by itself, to monitor the parameter.

Fortunately, the ratio of each modulated wavelength component over the unmodulated or reference wavelength component is also proportional to the parameter of interest. Because the modulated and reference wavelength components of the beam each traverse the common path elements whose losses are to be accounted for, the optical losses introduced by the elements are the same for each wavelength component. As a result, if the ratio of the modulated and reference wavelengths is used to evaluate the parameter of interest, the losses effectively cancel and do not influence the evaluation.

While the use of multiple wavelengths does allow common mode losses to be removed, the operation of the sensor may still be subject to "differential-mode" losses attributable to variations in the optical paths traversed by the different wavelength components once the input beam is split. Because the optical losses associated with these differential paths typically are not the same, the losses do not cancel when the ratio of modulated to reference wavelength components is used to monitor the parameter of interest. These differential-mode losses can be measured and accounted for electronically, as described above, but the process is expensive and time-consuming.

Another type of optical sensor in which some form of initial calibration may be important is a multiple-phase optical sensor. Such a sensor typically responds to a parameter of interest, like position, by producing two outputs exhibiting a relative phase difference. The analysis of this phase difference allows, for example, the direction of motion to be determined and position to be determined with higher resolution via interpolation.

To produce meaningful relative phase information, however, the various components of the sensor must be constructed and aligned to exacting tolerances. As a result, conventional multiple-phase sensors have been relatively difficult and expensive to produce. The prior art has suggested the use of adjustable lenses, mirrors and apertures to alter the optical paths within the sensor to introduce the desired relative phasing between the paths and otherwise eliminate the need for initial phase calibration.

One particular scenario of interest in which sensor losses and constructional variations present a problem relates to sensor interchangeability. In many applications, it is sometimes necessary to replace a damaged, inoperative, or outdated sensor. As will be appreciated, if the various optical components of a sensor are constructed and assembled to extremely close tolerances, the optical characteristics of the sensor will also fall within a relatively narrow range. As a result, an old sensor can be replaced with a new sensor, without significantly altering the operation of the sensor. The parameter of interest can then be evaluated by applying the new sensor's output to the same formula or look-up table used with the replaced sensor.

Unfortunately, it is often prohibitively expensive to produce optical sensors within such close tolerances. As a result, the performance of a new sensor may be considerably different than the that of the old sensor. As will be appreciated, these sensor-to-sensor variations can be accounted for by actually measuring the characteristics of the new sensor and altering the formula or look-up table used to compute the parameter of interest. Unfortunately, such a recalibration procedure is time-consuming, inconvenient, and expensive.

The problems presented by the recalibration of a system for use with a new sensor are particularly acute when only a portion of a complete sensing system is replaced. For example, some sensors do not include light sources or detectors and, instead, modulate optical beams received from remote sources and transmit the modulated beams back to remote detectors. The recalibration performed if such a sensor is replaced in a system is complicated by the need for information about both the sensor and the remote sources and detectors.

Reviewing now one particular prior an arrangement, U.S. Pat. No. 4,672,201 (Welker) discloses a multiple-phase, distance-measurement sensor that includes a plurality of light source and light detector pairs. An opaque scale and grating with transparent graduations are positioned between the sources and detectors and are movable relative to each other. Light directing lenses, positioned adjacent the light sources, can be adjusted in one direction to control the relative phase of the various detector outputs and in another direction to control the relative gain of the outputs. Thus, independent control over phase and gain is provided.

The Welker patent, however, nowhere addresses the problem of sensor interchangeability. The adjustments to gain are made simply to control the relative response of the different source/detector pairs in the sensor. In addition, because the Welker sensor includes light sources and detectors, the potential problems that might be presented by the replacement of a sensor used with remote sources and detectors are reduced.

In view of these observations, it would be desirable to provide a relatively low-cost sensor that can be used to quickly replace an existing sensor, without altering the way in which the sensor's output is processed.

SUMMARY OF THE INVENTION

The invention relates to a method of compensating sensors for interchangeable use in an environment. Each sensor has a particular construction and produces an output representative of a parameter of interest in response to an optical beam transmitted by the sensor. The method involves a step of determining the extent to which the particular construction of a sensor influences the output of the sensor, independent of the parameter of interest. The method also includes the step of adjusting the way in which the optical beam is transmitted by the sensor to reduce the extent to which the particular construction of the sensor influences the output of the sensor.

In accordance with another aspect of the invention, a sensor is provided for transmitting an optical beam as part of the production of an output indicative of a parameter the sensor is exposed to. The sensor includes a transmission element that defines a transmission path for the optical beam within the sensor, exposing the optical beam to losses that may influence the output of the sensor. An optical trimming element, positionable in the transmission path, is also provided to alter the optical beam to reduce the influence that the losses might otherwise have on the output of the sensor.

In accordance with a particular aspect of the invention, a sensor is disclosed for receiving an input optic beam including a first component and a second component. The sensor produces an output that is indicative of a parameter of interest and includes a first optical path, second optical path, modulation device, and compensation device.

In that regard, the first optical path transmits the first component of the input beam. Similarly, the second component of the input beam is transmitted by the second optical path. Both the first and second optical paths have losses associated therewith and at least a portion of the first and second optical paths are different. The modulation device is associated with the first path and modulates the first component of the input beam with information regarding the parameter of interest. The compensation device optically influences at least one of the first and second optical paths to alter the optical losses associated therewith to some predetermined level that is sufficient to allow the output to be interpreted substantially uninfluenced by the losses.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
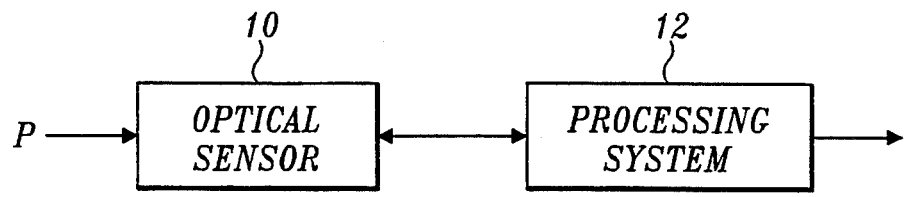
FIG. 1 is a block diagram of a system including a sensor constructed in accordance with this invention.

Referring now to FIG. 1, an optical sensor 10 is shown for use with a processing system 12 to monitor a parameter P of interest. The optical sensor 10 produces an output that is modulated in response to the parameter P. This output is applied to the processing system 12, which produces the desired indication of the parameter P.

Figure 2:
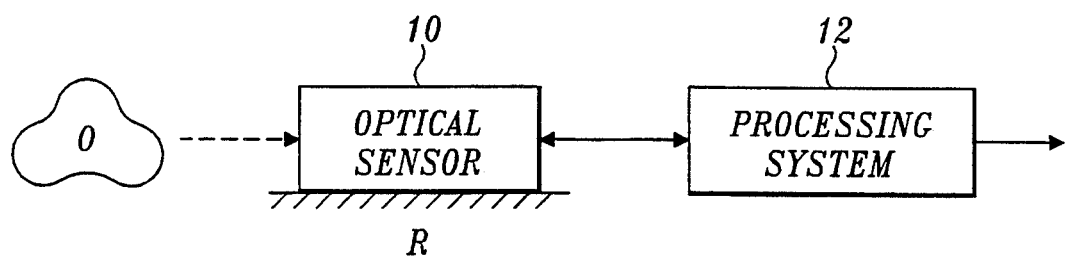
FIG. 2 is a block diagram of the system of FIG. 1 used to monitor the position of an object O relative to a reference frame R.

In one application of particular interest shown in FIG. 2, the parameter of interest is the position of an object O relative to a reference frame R. The optical sensor 10 is mechanically coupled to both the object O and reference frame R. The sensor output is conditioned by the processing system 12 to allow the position of the object O relative to reference frame R to be determined.

As will be appreciated, in the event sensor 10 becomes damaged or malfunctions, it may be necessary to replace sensor 10. Traditionally, however, the replacement of a sensor has been a relatively complicated operation. In addition to the mechanical requirements involved in the removal and replacement of a sensor, the operator has been required to recalibrate or reprogram the processing system 12 to account for variations in the internal optical losses introduced by the new sensor. As will be described in greater detail below, a sensor 10 constructed in accordance with this invention is optically trimmed to eliminate the need for any such recalibration or reprogramming.

Figure 3:
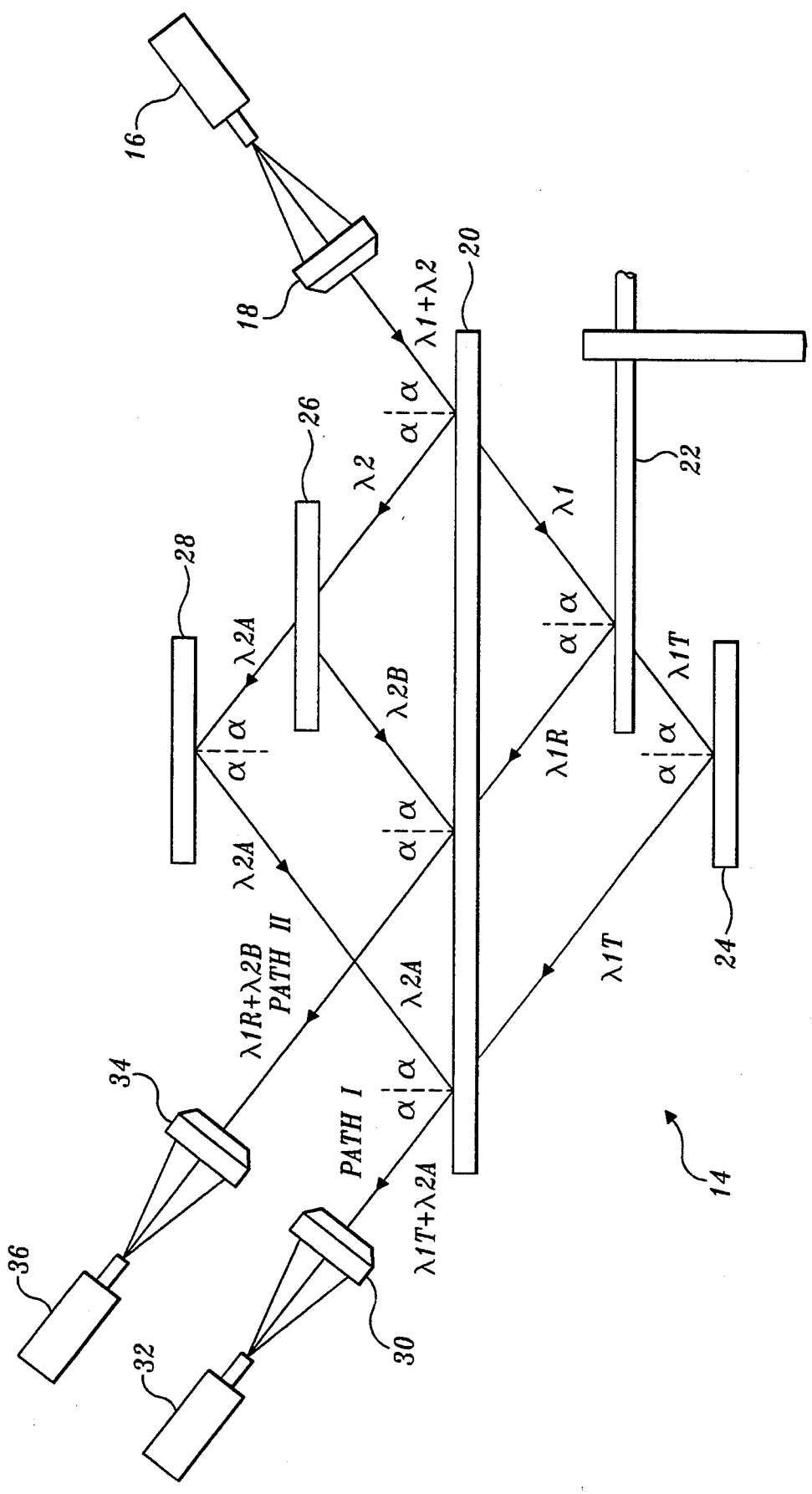
FIG. 3 is a schematic diagram of one embodiment of an optical sensor of the type that can be used in the system of FIG. 1.

To illustrate some of the losses compensated for by the present invention, as well as the operation of one form of optical sensor, reference is had to FIG. 3. In that regard, a two wavelength, passive optical sensor 14 is illustrated for use in measuring position as represented by FIG. 2.

Reviewing the construction and operation of sensor 14 in greater detail, sensor 14 receives input radiation from the processing system 12 via an input optical fiber 16. The input radiation includes two components having separate wavelengths $\lambda 1$ and $\lambda 2$. As will be described in greater detail below, the $\lambda 1$ component is ultimately modulated with the desired positional information, while the $\lambda 2$ component is used for reference.

An input lens 18 collimates the radiation emitted by fiber 16 and directs the collimated beam to an interference filter 20. The interference filter 20 is constructed to pass the $\lambda 1$ component of the collimated beam. Filter 20 also reflects the $\lambda 2$ component of the input beam.

After traversing filter 20, the $\lambda 1$ component of the collimated input beam impinges upon an optical encoder 22. The optical encoder 22 transmits a portion $\lambda 1T$ of the $\lambda 1$ component and reflects another portion $\lambda 1R$. As will be described in greater detail below, the encoder 22 may be of the rotary or linear type and includes a coded surface pattern of varying reflective character. With the encoder 22 coupled to object O, motion of the object induces a corresponding motion in the coded pattern provided on the surface of encoder 22. As a result, the moving surface pattern modulates the $\lambda 1T$ and $\lambda 1R$ portions of the input beam with information representative of the object's motion.

The $\lambda 1R$ portion of the input beam reflected by encoder 22 is directed back to the interference filter 20, where it is transmitted along an output path II. On the other hand, the $\lambda 1T$ portion of the input beam transmitted by encoder 22 travels on to a mirror 24. The mirror 24 then reflects the $\lambda 1T$ portion back to interference filter 20, where it is transmitted along an output path I.

As previously noted, the reference component $\lambda 2$ of the input beam is initially reflected by the interference filter 20. A dot pattern beam splitter 26 then splits the $\lambda 2$ component into two equal portions $\lambda 2A$ and $\lambda 2B$. The $\lambda 2A$ portion is transmitted to a mirror 28 where it is reflected back to the interference filter 20. The filter 20 then reflects this $\lambda 2A$ portion of the reference component along output path I. The $\lambda 2B$ portion, on the other hand, is reflected by beam splitter 26 directly to filter 20, where it is again reflected along output path II.

As shown in FIG. 3, the angles of incidence, reflection, and refraction associated with filter 20, encoder 22, mirror 24, beam splitter 26, and mirror 28 are all equal to $\alpha$. The spatial separation of these various components is such that, for the angle $\alpha$ involved, the modulated $\lambda 1T$ portion of the input beam and the reference $\lambda 2A$ portion combine along path I to form a first sensor output. Similarly, the modulated $\lambda 1R$ portion of the input beam and the reference $\lambda 2B$ portion combine along path II to form a second sensor output.

The first sensor output is focused by an output lens 30 before being transmitted to the processing system 12 by an optical fiber 32. The second sensor output is likewise focused at an output lens 34 before being transmitted to the processing system 12 by a second optical fiber 36. Each of the various components of sensor 10 are well known and, for that reason, are not described in greater detail herein.

Figure 4:
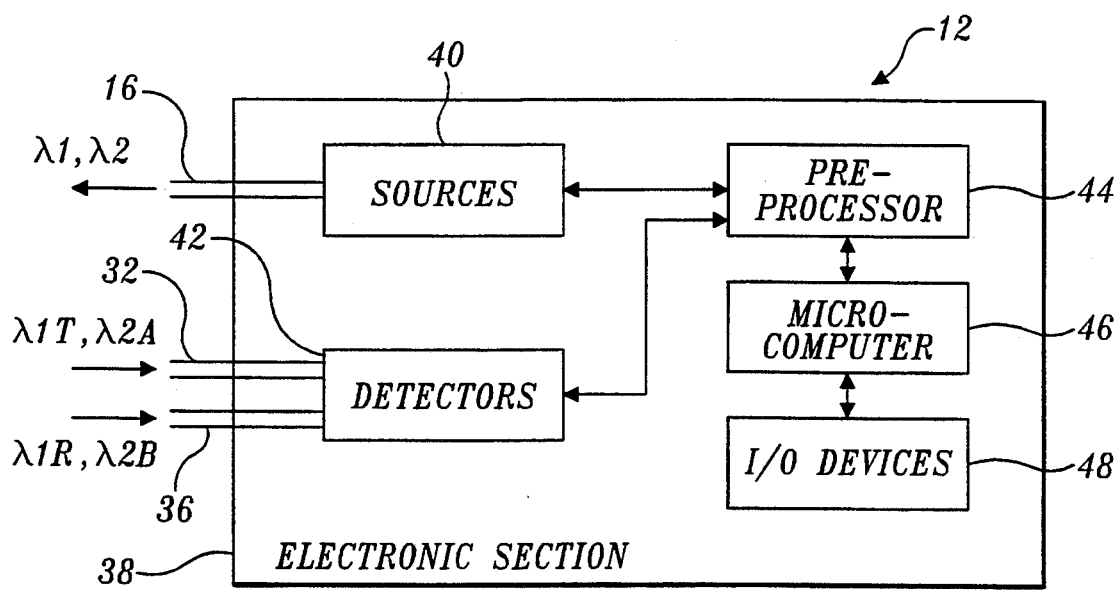
FIG. 4 is a schematic diagram of one embodiment of a processing system of the type used in FIG. 1.

Reviewing briefly the components of the processing system 12, reference is had to FIG. 4. Along with the optical fibers 16, 32, and 36 noted above, system 12 includes an electronic section 38. Section 38 includes, for example, light emitting diode (LED) sources 40 that emit radiation having wavelengths $\lambda 1$ and $\lambda 2$ into the optical fiber 16. Photodetectors 42 receive the first and second sensor outputs from fibers 32 and 36 and produce corresponding electrical output signals. A preprocessor 44 then conditions the signals for analysis by a microcomputer 46. The desired inputs and outputs to processing system 12 are applied to microcomputer 46 via various input/output (I/O) interfaces and peripherals 48. As with the elements of sensor 10, the various components of processing system 12 are well known and, for that reason, are not described in greater detail herein.

Figure 5:
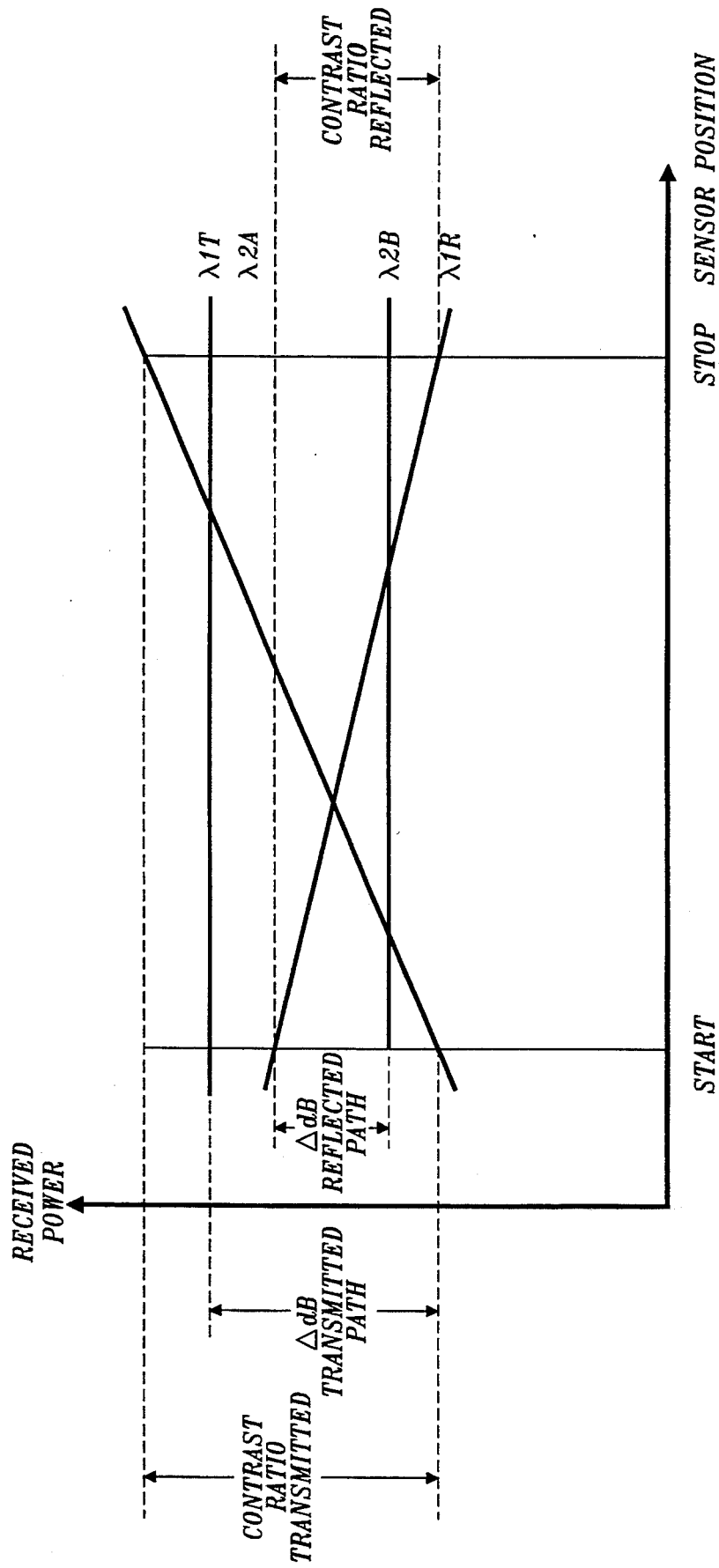
FIG. 5 is a graphic representation of the operation of the sensor of FIG. 3.

Reviewing the operation of the basic system illustrated in FIGS. 3 and 4, assume that the body of sensor 14 is attached to reference frame R and the encoder 22 is coupled to object O. As a result, motion of object O relative to reference frame R moves encoder 22, which modulates the λ1T and λ1R portions of the input beam. As depicted graphically in FIG. 5, the surface of encoder 22 transmits increasingly more of the λ1 component as the encoder 22 moves from an initial, or start, position. Thus, the intensity of the λ1T portion, which is transmitted by the encoder 22, is directly proportional to the position of encoder 22 and hence object O. Because the λ1R portion represents the remainder of the λ1 component, which is constant, the intensity of the λ1R portion reflected by encoder 22 is necessarily inversely proportional to the position of encoder 22.

Unlike the modulated portions of the input beam, the reference portions λ2A and λ2B of the input beam are not exposed to encoder 22 and are not influenced by motion of object O. As a result, the intensities of portions λ2A and λ2B do not vary as a function of position and are shown with zero slope in FIG. 5. In the arrangement shown, the intensity of portion λ2A is greater than that of portion λ2B, although the intensity of portion λ2A may be less than that of portion λ2B depending on the nature of the components traversed by the different wavelength portions.

As previously noted, the first sensor output is received by processing system 12 through fiber 32 and includes the modulated λ1T portion and reference λ2A portion of the input beam. The second output from sensor 14, received by processing system 12 via fiber 36, includes the modulated portion λ1R of the input beam and the reference portion λ2B.

The two optical outputs from sensor 10 are initially received by the photodetectors 42 of processing system 12. The photodetectors 42 respond by producing a pair of corresponding electrical signals. The preprocessor 44 then amplifies these signals, identifies the corresponding λ1T, λ1R, λ2A, and λ2B portions of the electrical signals, and converts the electrical signals to digital form for analysis by microcomputer 46.

The microcomputer 46 includes memory programmed with the various instructions required to operate system 12. In that regard, the position P of the object O is calculated by the microcomputer 46 in accordance with the following difference/sum equation:

$$P = (\lambda 1T/\lambda 2A - 1R/\lambda 2B)/(\lambda 1T/\lambda 2A + \lambda 1R/\lambda 2B) \qquad (1)$$

As will be appreciated, equation (1) is a simplified, proportional expression of position P. Various coefficients must be added to equation (1) to cause the position P to be determined with the desired English of metric units.

The numerator or difference term of equation (1) is proportional to position P, while the denominator or sum term is independent of position and acts as a check on the integrity of the sensor. It should also be noted that each "modulated" term included in equation (1) is divided by a "reference" term. Each modulated term and the reference term it is divided by are also associated with the same sensor output, as well as the same sensor input. As a result, the optical beams associated with each ratio thus traverse the same paths outside the sensor and at least partially the same paths inside the sensor. Given the ratios used in equation (1), the losses associated with these common paths cancel. As a result, the determination of position P using two wavelengths and equation (1) is not influenced by the path losses common to both wavelengths and both input and output paths.

While the two-wavelength construction of sensor 14 accounts for common mode losses, some initial calibration is required to compensate for the differential mode losses attributable to the independent sections of the modulated and reference wavelength paths. If sensor 14 is replaced with a new sensor, constructional variations in the new sensor may cause the differential-mode losses associated with the new sensor to differ from those of the old sensor. As a result, some recalibration or electrical trimming of the system 12 would conventionally be required to ensure the proper interpretation of the sensor outputs.

Figure 6:
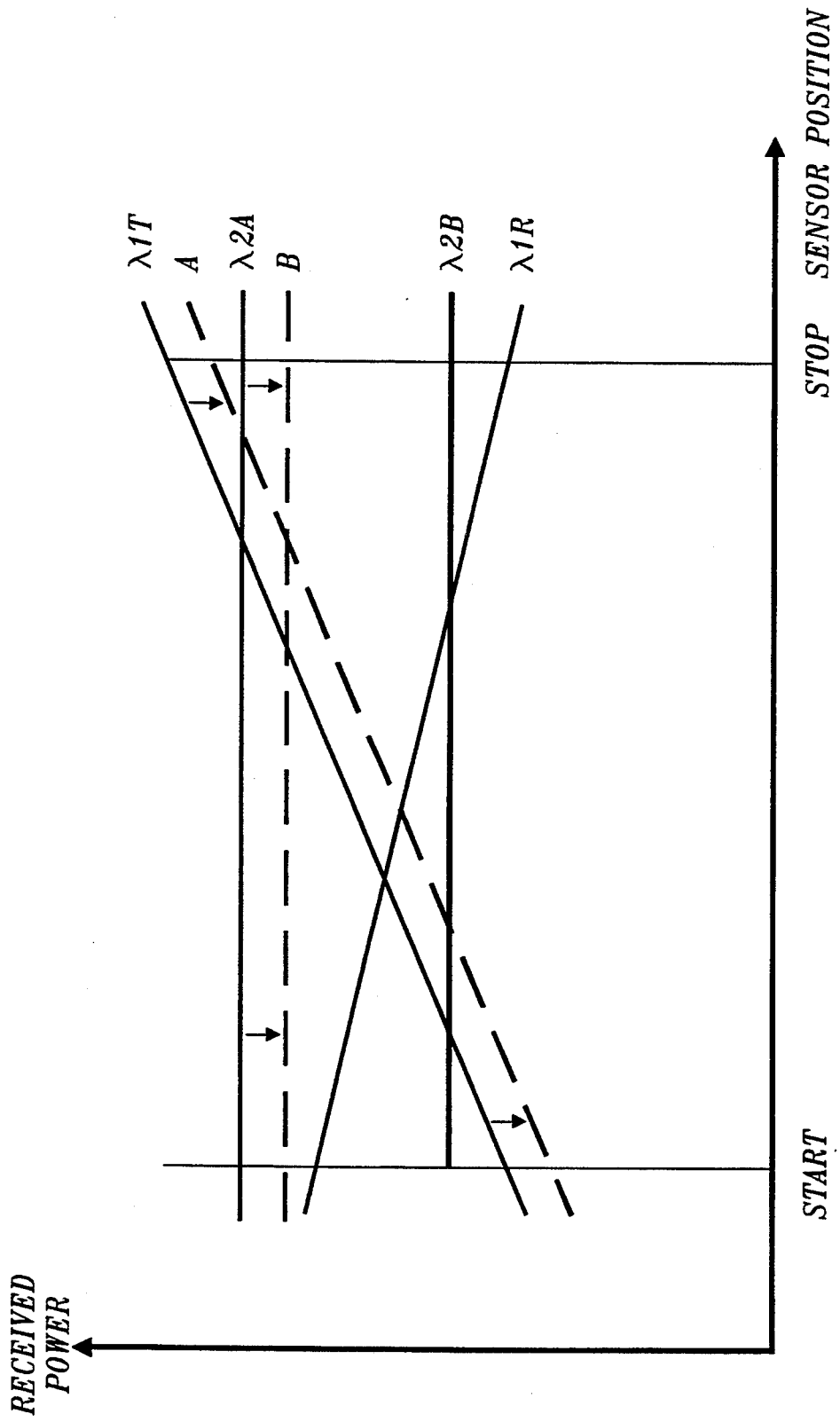
FIG. 6 is a graphic representation of the operation of the sensor of FIG. 3 in response to a difference in the losses introduced by the sensor.

Reviewing the problem graphically, as shown in FIG. 6, suppose the elements of the new sensor that are traversed solely by the λ1T portion of the input beam introduce greater losses than the corresponding elements of the old sensor. The intensity of the λ1T portion will necessarily decrease. As shown in FIG. 6, assuming that the increased losses are not related to the encoder, these differential-mode losses will be the same for each position and the relationship between intensity and position (see curve A) will have the same slope as before, but a different Y-intercept.

A number of different options are available for eliminating the influence that such variations in differential-mode losses might otherwise have upon the position P computed with the aid of equation (1). In the scenario discussed, for a given encoder position, the intensity of the λ1T portion is less than it would have been for the original sensor. As a result, the λ1Tλ2A term in the numerator and denominator of equation (1) will also be smaller. If the same value for P is to be achieved, however, the relationship between the numerator and denominator of equation (1) must remain the same.

As will be appreciated, this can be achieved by decreasing the reference portion λ2A, as indicated by curve B in FIG. 6, until the ratio of λ1T/λ2A is restored. Alternatively, the modulated portion λ1R could be decreased, or the reference portion λ2B increased, to initiate the requisite shift in both the numerator and denominator. As yet another option, two or more of these portions could be altered to in the directions indicated to collectively restore the computation of position P. As will be described in greater detail below, the requisite adjustments in the intensity of various portions of the input beam are achieved by a process referred to herein as optical trimming.

To further illustrate the relationship between differential-mode loss variations and the determination of position P, suppose that the optical losses associated with the path of the λ1T portion in the newly inserted sensor 14 are, instead, less than those of the original sensor. The intensity of the λ1T portion of the beam will then be greater for a given position of the encoder 22. As a result, if the determination of position P is to remain unaffected, the λ2A and/or λ1R portions must also be increased, and/or the λ2B portion decreased.

As will be appreciated, variations in sensor construction may similarly introduce different losses into the independent sections of the paths traversed by the λ1R, λ2A, λ2B portions of the input beam when a sensor is replaced. As with the variations in the λ1T portion described above, however, the influence of the resultant differential-mode losses on equation (1) can be eliminated by adjusting the intensity of one or more of the other portions of the input beam correspondingly.

Having reviewed functionally the nature of the problem and the type of solution to be implemented, the sources of potential variations in optical losses from sensor-to-sensor will now be considered in greater detail, along with the way in which such losses are to be optically trimmed. To that end, reference is now had to FIG. 7, which provides a partial view of one embodiment of a sensor 50 constructed in accordance with this invention.

In the arrangement shown, the sensor 50 includes a first prism 52, which separates an interference filter 54 and beam splitter 56. Prism 52 provides a transmission medium for optical radiation received from the input lens 58 and reflected by interference filter 54. A second prism 60 separates the beam splitter 56 and a mirror 62, and provides a transmission medium for optical radiation passing therebetween. A support plate 64 supports prisms 52 and 60, without refracting light.

An encoder 66 is positioned adjacent, but spaced apart from, the support plate 64. A variable density dot pattern 68 is provided on the upper surface of the encoder 66 to induce the desired modulation in the $\lambda 1$ component of the input beam as the encoder moves. A mirror 70 is provided on the lower surface of the encoder 66 to reflect the $\lambda 1R$ portion of the modulated component.

Figure 7:
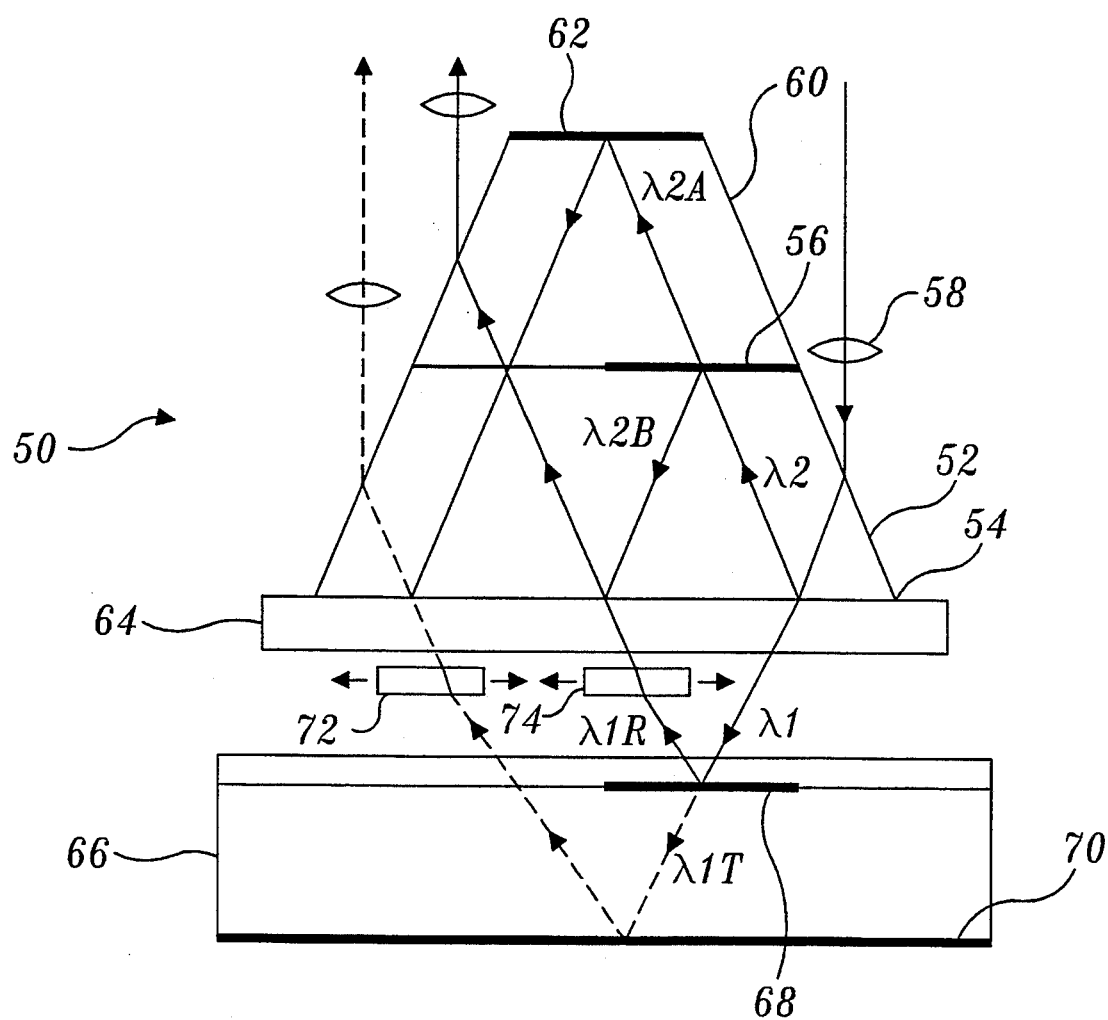
FIG. 7 is a sectional view of one embodiment of the sensor of FIG. 3.

The most important difference between the sensor 50 of FIG. 7 and the sensor 14 of FIG. 3 is, however, the inclusion of some form of optical trimming device. In the arrangement shown, a transmissive optical trimmer, in the form of one or more trimming filters 72 and 74, is included in sensor 50. As will be described in greater detail below, filters 72 and 74 alter the intensity of select portions of the input beam to ensure that the outputs of any such sensor 50 can be interpreted in accordance with a single version of equation (1) used by processing system 12. As a result, a sensor 50 can be removed from a system and replaced with another sensor 50, without requiring any revision of the processing system 12.

In the particular sensor 50 shown in FIG. 7, potential variations in the optical losses from sensor-to-sensor may be attributable to a variety of sources. For example, the "DC" variations that can be optically trimmed include the sensor's position, the focal position of fibers 30 and 36, encoder thickness (vary top, vary bottom), encoder disk air gap space, first and second prism heights, prism upper surface tilt, prism entrance face tilt, and prism angular sensitivity. In a worst case scenario involving sensors of the type shown in FIG. 7, variations in losses from sensor-to-sensor may be on the order of 1.7 db. As discussed in greater detail below, a variety of techniques have been developed for optically trimming these losses by adjusting the transmission, reflection, and alignment of the various optical components in the sensor 50.

Reviewing these various solutions individually, several transmission solutions will be reviewed first. As noted above, optical filters 72 and 74 may be included in the path of the $\lambda 1T$ and $\lambda 1R$ portions of the input beam to optically trim the intensity of one or both of these portions to compensate for any deviations in the internal losses introduced during the initial construction of sensor 50.

Figure 8:
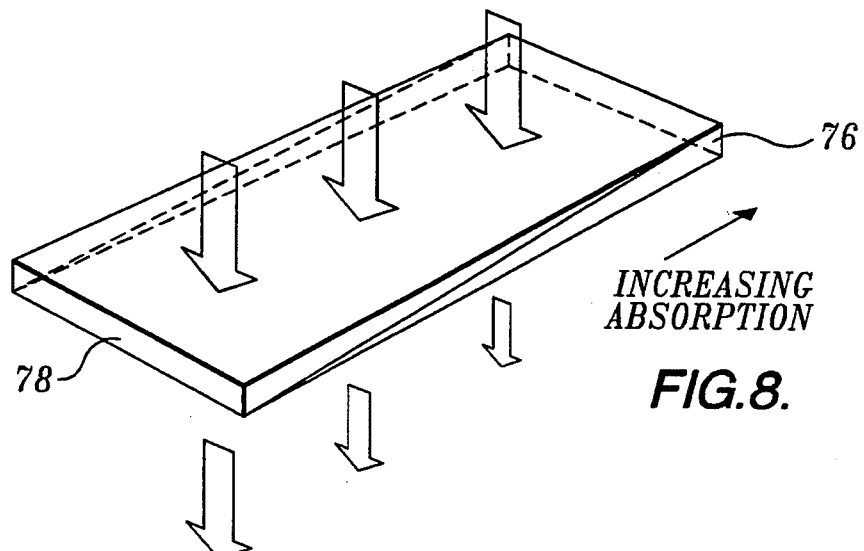
FIG. 8 is a pictorial view of one embodiment of a variably transmissive filter used in the sensor of FIG. 7.

One particular construction used for filters 72 and 74 is shown in FIG. 8. In this arrangement, filters 72 and 74 are neutral-density (i.e., not wavelength selective).

Each filter 72 and 74 includes a "high absorption" glass wedge 76 and a "low absorption" glass wedge 78. In one embodiment, wedge 76 is a Schott neutral density glass Type NG-11. This particular wedge 76 is 0.78 transmissive (per one millimeter) and has a refractive index of 1.502. Wedge 78, on the other hand, is a Schott optical glass Type BK-7, which is 0.999 transmissive at a thickness of five millimeters and has a refractive index of 1.51.

In a preferred arrangement, both wedges 76 and 78 are roughly 30 millimeters long and five millimeters wide. The wedges taper from a maximum thickness of one millimeter and are reversed in direction to form a parallelepiped structure. An ultraviolet-sensitive adhesive is applied between wedges 76 and 78 and ultraviolet light passed through the structure to secure the wedges together. To limit unwanted fresnel reflections from the filters, each filter 72 and 74 may be covered with an antireflective coating (odd number of one-quarter wavelength layers) such as magnesium fluoride.

Due to the tapered nature of the wedges 76 and 78, even though both halves of filters 72 and 74 are of uniform and neutral density, the overall transmissivity of filters 72 and 74 varies from one end to the other. As a result, if an optical beam is passed through the filter, the intensity of the emergent beam decreases with distance from the end marked "x" in FIG. 8. By mechanically adjusting which part of the filter 72 or 74 the beam passes through, the intensity of the beam can thus be trimmed.

As will be appreciated, the variably transmissive filter shown in FIG. 8 represents only one of a variety of useful filter constructions. In that regard, in an alternative filter configuration shown in FIG. 9, regions of constant or uniform transmissivity are provided at each end of a variably-transmissive region.

Figure 9:
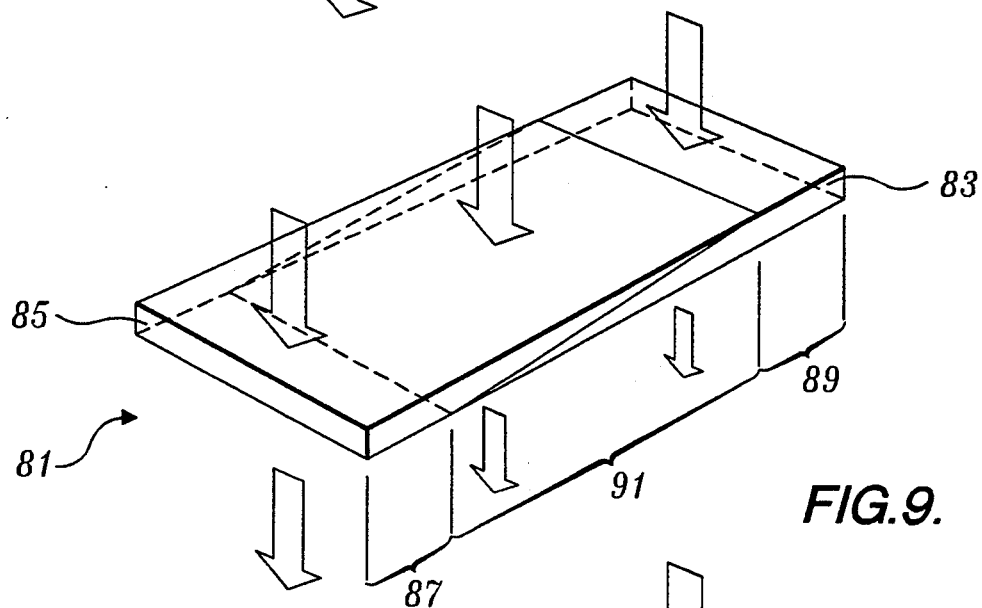
FIG. 9 is a pictorial view of an alternative embodiment of the filter of FIG. 8, which includes regions of uniform and variable transmissivity.

More particularly, the filter 81 of FIG. 9 is formed by two components 83 and 85. Each component 83 and 85 includes a region of uniform thickness and a region of tapered thickness, with the two tapered regions being reversed and joined in the manner previously discussed in connection with FIG. 8. As a result, with component 83 made of high-absorption glass and component 85 made of low-absorption glass, filter 81 includes a region 87 of low transmissivity, a region 89 of high transmissivity, and a region 91 whose transmissivity varies continuously from the high level to the low level.

Figure 10:
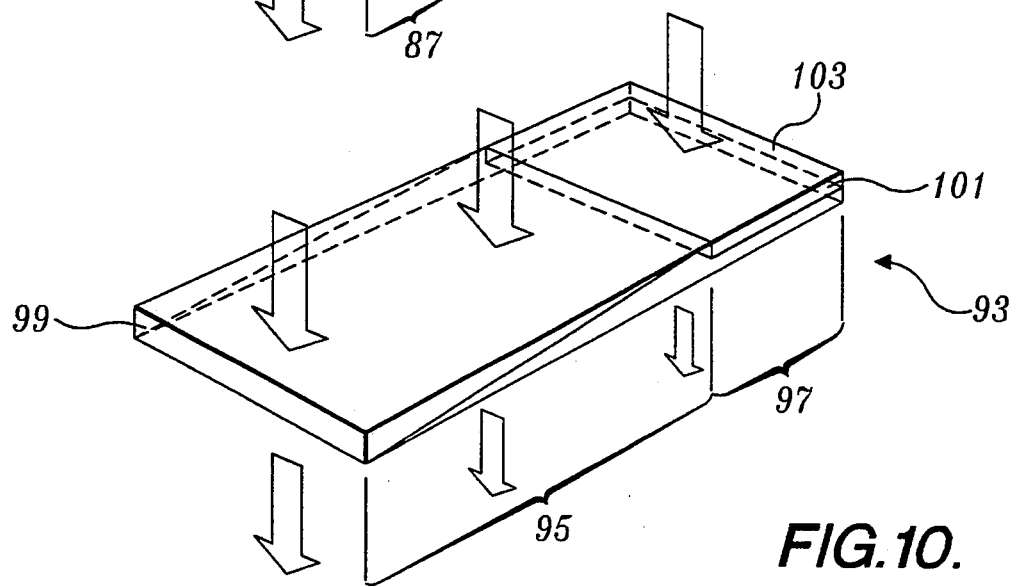
FIG. 10 is a pictorial view of yet another alternative embodiment of the filter of FIG. 8.

Yet another filter construction is shown in FIG. 10. In this embodiment, the filter 93 includes a region 95 of varying transmissivity and a region 97 of uniform transmissivity. The filter 93 includes three separate elements 99, 101, and 103. The first element 99 is a tapered wedge similar to wedge 76 or 78. The second element 101 includes a tapered segment that is similar to element 99, and a segment whose uniform thickness is less than the maximum thickness of the tapered segment. The first element 99 is reversed with respect to the tapered segment of element 101 to form the region 95 of varying transmissivity. The third element 103 is of uniform thickness and is positioned adjacent the uniform segment of the second element 101 to form the region 97 of uniform transmissivity. As will be appreciated, with more than one type of glass used to form region 97, the transmissivity of region 97 is a function of the relative type and thickness of the different materials used.

Although not shown in the FIGURES, a variety of other filter arrangements can be employed as desired. For example, multiple pairs of wedges can be employed in a single filter to provide different regions of varying transmissivity. Similarly, filters of the type described above can be stacked in the optical path to collectively attenuate an optical beam passing therethrough. As will be appreciated, by adjusting the relative position of the various filters included in a stack further control over the trimming of the optical beam can be achieved.

Discussing now the way in which the various filters disclosed above may be used to optically trim a sensor, the operation of the sensor 50 shown in FIG. 7 is first evaluated without the filters. More particularly, the encoder 66 is moved an amount corresponding to a predetermined variation in an object's position. The two optical outputs of sensor 50 are then evaluated by processing system 12 in accordance with equation (1) to determine the apparent change in the object's position. Depending upon the nature of the losses introduced by sensor 50, the apparent change in position may be greater or less than the true change in position. As will be appreciated from the previous discussion of equation (1) and the relationship of the various terms included therein, if the apparent change in position is greater than the true change in position, it may be necessary to increase the intensity of the $\lambda 1T$ portion and/or decrease the intensity of the $\lambda 1R$ portion.

To trim sensor 50, the filters 72 and 74 are first coated with an ultravioletsensitive adhesive and then positioned in the air gap between support plate 64 and encoder 66. The filters 72 and 74 allow the $\lambda 1R$ and $\lambda 1T$ portions of the optical beam to be trimmed. In that regard, the axial position of each filter 72 and 74 can be adjusted to control the amount of the $\lambda 1R$ and $\lambda 1T$ portions transmitted. As filters 72 and 74 are adjusted, the two sensor outputs are processed by system 12, until the apparent change in position represented by the output of processing system 12 corresponds to the true change in position.

Once filters 72 and 74 are properly positioned, they are irradiated with an ultraviolet light. The ultraviolet light cures the adhesive applied to the filters prior to insertion and secures the filters in place. As a result, a trimmed sensor 50 is provided for ready substitution in the system.

Figure 11:
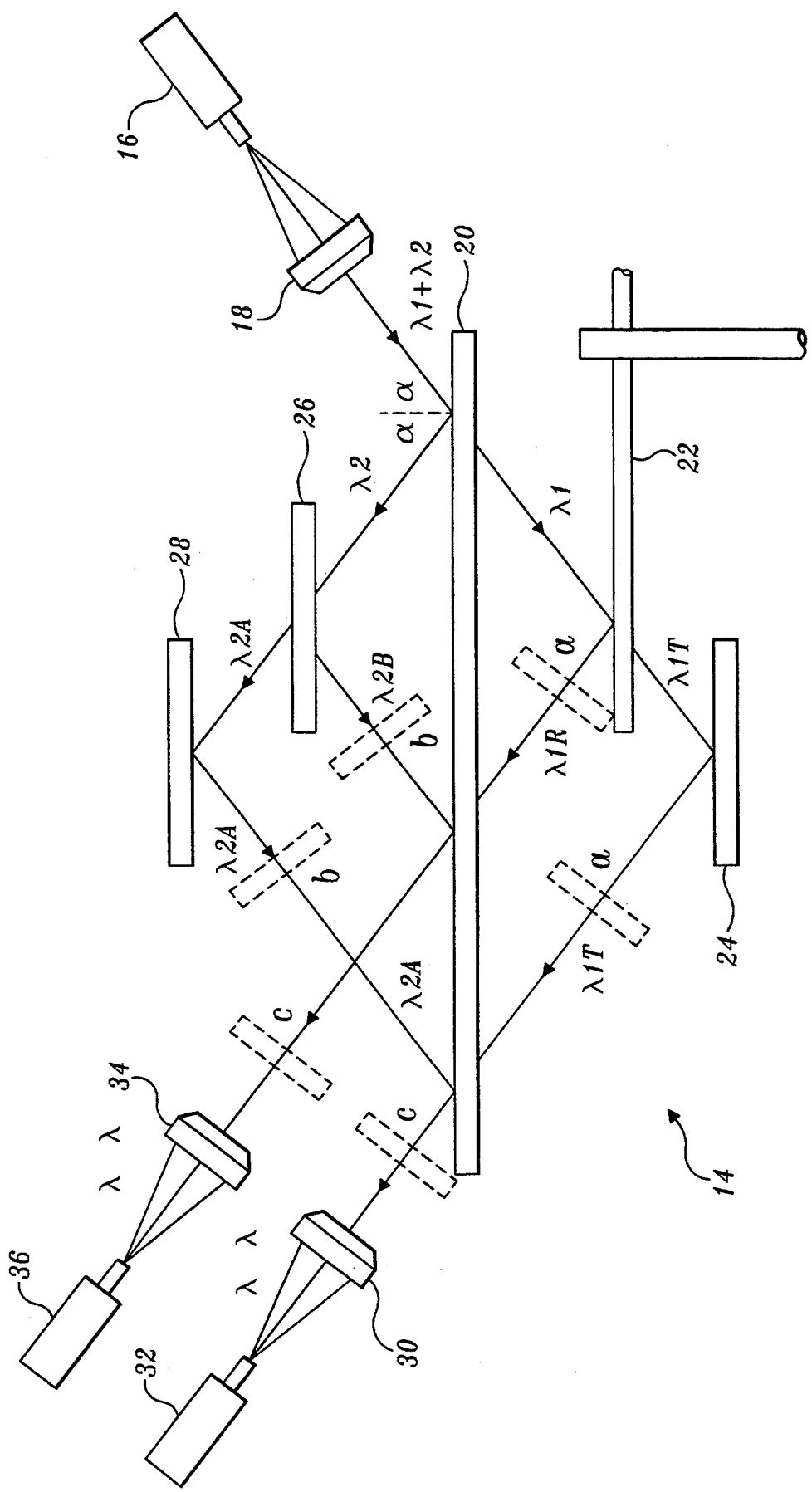
FIG. 11 is a schematic diagram of the sensor of FIGS. 3 and 7, illustrating various possible locations in which a filter can be used to optically trim the sensor.

As will be appreciated from the earlier discussion of equation (1) and the various alternatives for adjusting the terms to compensate for variations in losses, it may be that only one of the filters 72 and 74 needs to be positioned in one of the paths of the $\lambda 1T$ and $\lambda 1R$ portions of the input beam. Alternatively, it may be desirable to trim different portions of the beam corresponding to different terms of equation (1). For example, as shown in FIG. 11, instead of positioning one or both of the optical filters 72 and 74 at the points marked "a," the filters can of course be positioned at the points represented by the letters "b" or "c".

In that regard, with one or both of the filters 72 and 74 located at the positions indicated by letter b, the reference $\lambda 2A$ and/or $\lambda 2B$ portions of the input beam can be trimmed in the manner described above. The filters 72 and 74 used at b are constructed in the manner previously discussed.

As another alternative, one or more filters may be located at the positions indicated by the reference letter c (or at some point external to the sensor, such as the "pigtails" used to couple the sensor to the fibers leading to the processing system 12). These filters process the first and second outputs of sensor 50, each of which includes a modulated and reference component. Wavelength selective filters are employed, however, because only one of the modulated or the reference components of each output is to be trimmed. In the preferred arrangement, the filter location represented by the letter "a" is preferred because, as shown in FIG. 7, the existing air gap allows the filters to be readily inserted and adjusted.

Figure 12:
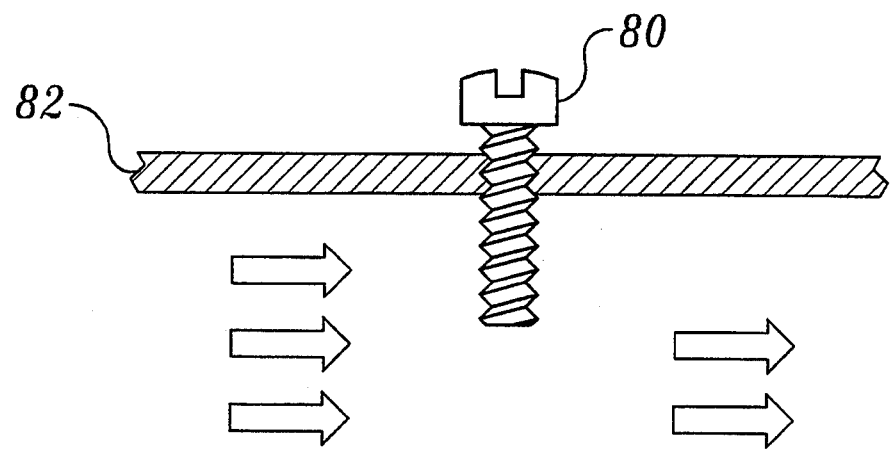
FIG. 12 is a pictorial view of an adjustable screw that can be used in place of the filter of FIG. 8 to trim the sensor.

The use of the filters 72 and 74 discussed above represents only one of several different "transmission" or "absorption" approaches that can be used to optically trim the sensor 50. For example, a particular optical beam or beams can be trimmed by partially positioning an opaque blocking element in the beam's path. In that regard, as shown in FIG. 12, a screw 80 is threaded through a portion of the sensor housing or support structure 82 adjacent the optical path of the beam whose intensity is to be controlled. The screw 80 preferably projects roughly perpendicularly into the path of the beam.

By rotating screw 80, the axial projection of the screw 80 into the optical path can be adjusted. As a result, the total radiation traversing the optical path can be controlled. Because the use of screw 80 does not allow wavelength-selective trimming to be achieved, screw 80 can be used at the points indicated with the reference letters a and b in FIG. 12, but is unsuitable for use in the output paths marked with the reference letter c.

Figure 13:
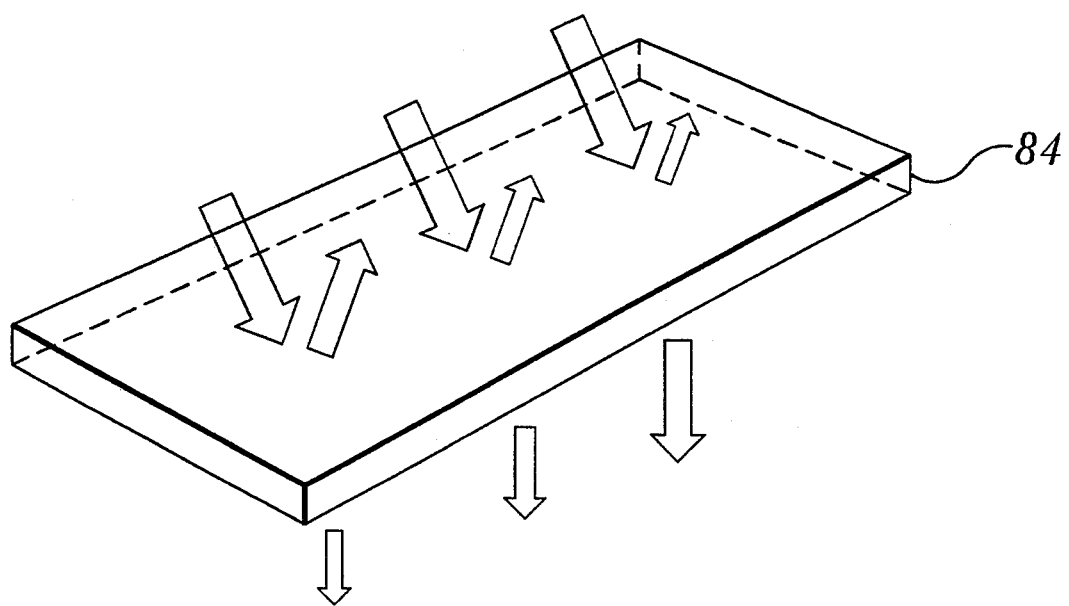
FIG. 13 is a pictorial view of a variably reflective mirror that can be used in place of the filter of FIG. 8 to trim the sensor.

As previously noted, the transmission solution is one approach used to optically trim the sensor 50 for those variations in optical path losses that would otherwise occur from sensor-to-sensor. A reflective solution has also been devised in which the amount of optical signal traversing a path is controlled by reflecting an adjustable amount of optical signal. In that regard, a variably reflective mirror 84, shown in FIG. 13, is positioned in the optical path of interest. More particularly, the reflectivity of the mirror 84 varies continuously from one end to the other and, as a result, the radiation transmitted through mirror 84 also varies continuously from one end to the other in a manner similar to filters 72 and 74.

Because both the reflected and transmitted radiation varies continuously across the mirror 84, either component can be used in the sensor output. In either case, the axial position of the minor 84 relative to the beam is adjusted to trim the beam and, hence, the sensor. If the sensor is constructed to further process radiation reflected by mirror 84, an absorber can be positioned on the emergent surface of mirror 84 to absorb radiation transmitted by mirror 84 and prevent it from interfering with the sensor's operation.

As an alternative, a mirror of uniform reflectivity can be positioned in the path. The orientation of such a mirror must, however, be made adjustable to control the amount of light reflected along and out of the path of interest.

As will be appreciated, mirrors can be positioned at the points indicated with the letters a and b in FIG. 11, and if a wavelength selective mirror is employed, at the points indicated with the letters c. The proper orientation of mirror 84 in a particular optical path is determined in the manner previously described in connection with filters 72 and 74. Of course, care must be exercised to ensure that the reflected, and unused, radiation is not unintentionally coupled into the sensor output or otherwise disruptive of sensor operation.

Yet another technique of optically trimming the sensor 50 is to adjust the alignment of the various elements of sensor 50 that define a particular optical path. Once the sensor is initially constructed and its losses evaluated, such adjustments can be made to achieve the desired uniformity and losses from sensor-to-sensor. For example, it may be convenient to alter the relative angular, axial, and lateral alignment of the various lenses, fibers, and mirrors. Once the desired alignment is achieved, ultraviolet-sensitive adhesive applied to the components can be "cured" with ultraviolet light to fix the components in place. Optical trimming in this fashion is, however, currently the least favored technique, because it can be relatively difficult and expensive to introduce and maintain the desired adjustments in the optical path.

The preceding discussion, in connection with FIGS. 3, 7 and 11, has considered the optical trimming of two wavelength, passive, analog sensors. As will be appreciated, however, the techniques described above can be used with various other sensor constructions. For example, a hybrid or self-generating analog optical sensor may be trimmed in this manner. Further, the sensor may use radiation having only a single wavelength or more than two wavelengths.

In each of these alternative analog applications, there are one or more optical paths whose losses may vary from one sensor to another. If such sensors are to be interchanged without otherwise altering the analysis performed upon the sensor's output, some form of trimming in the foregoing manner must be employed.

Along with these various analog sensor constructions, similar trimming problems arise in the context of "digital" sensors and hybrid analog/digital sensors. Digital sensors typically include a single input beam that is split into n different channels of optical radiation. These channels are then modulated, for example, by an encoder, before being output and introduced into a single optical fiber. As will be appreciated, due to variations in the n different optical paths associated with the various channels, some form of trimming is desirable if each channel is to be interpreted the same and if the sensors are to be interchangeable.

Discussing the construction and operation of digital sensors in greater detail, two forms of such sensors that are of particular interest involve the use of time division multiplexing (TDM) and wavelength division multiplexing (WDM). In a TDM digital sensor 86, shown in FIG. 14, a single pulse of radiation is received by sensor 86 via an input optical fiber 88. A beam splitter 90 divides the input pulse into n separate beams that are applied to n different optical paths 92, formed, for example, by optical fibers or waveguides within an optical read head. The optical paths 92 define n different channels. Each of the beams in the various channels 92 is then exposed to, for example, an encoder 94, which modulates positional information onto the beams.

An optical delay line 96 in the form of optical fibers is positioned downstream of the encoder 94 in each channel 92. The time delays introduced by delay lines 96 are dependent upon the length of the optical fiber and are selected to allow the modulated beam in each successive channel 92 to be delayed sufficiently so that the beams can be recombined by a multiplexer 98 on a single output fiber 100. Specifically, the beam traversing each channel 92 will represent a successive pulse in the beam transmitted by fiber 100.

As will be appreciated, because information regarding the parameter of interest is modulated onto the various pulses, the processing system 12 can be constructed to monitor the parameter of interest based upon the output of such a TDM sensor. In that regard, by comparing the pulses for each of the various channels to some threshold or thresholds, an evaluation of the modulation and parameter of interest can be made. Variations in the optical losses introduced by the different channels may, however, cause the channels to be interpreted differently.

These loss variations can be trimmed electrically by varying the thresholds against which the pulses are compared to account for variations in channel losses. In the preferred arrangement, however, each channel 92 is trimmed optically with one of the transmissive, reflective, absorptive or optical alignment techniques described above. For example, variable filters 105 of the type described above can be positioned in each channel 92 in the air gap included between the encoder and optical fiber or readhead. As a result, each channel within a given sensor is interpreted uniformly, as is the operation of one sensor used in place of another.

As will be appreciated, this same form of trimming can be used in a reflective TDM sensor. A reflective TDM sensor is similar to the sensor shown in FIG. 14. In this arrangement, however, the requisite delays and filters are positioned in the portion of each channel leading to the encoder. Each of the n different components reflected by the encoder is then trimmed after being applied to the encoder and returned through the same channels before being combined back onto the input fiber as a single output.

Figure 15:
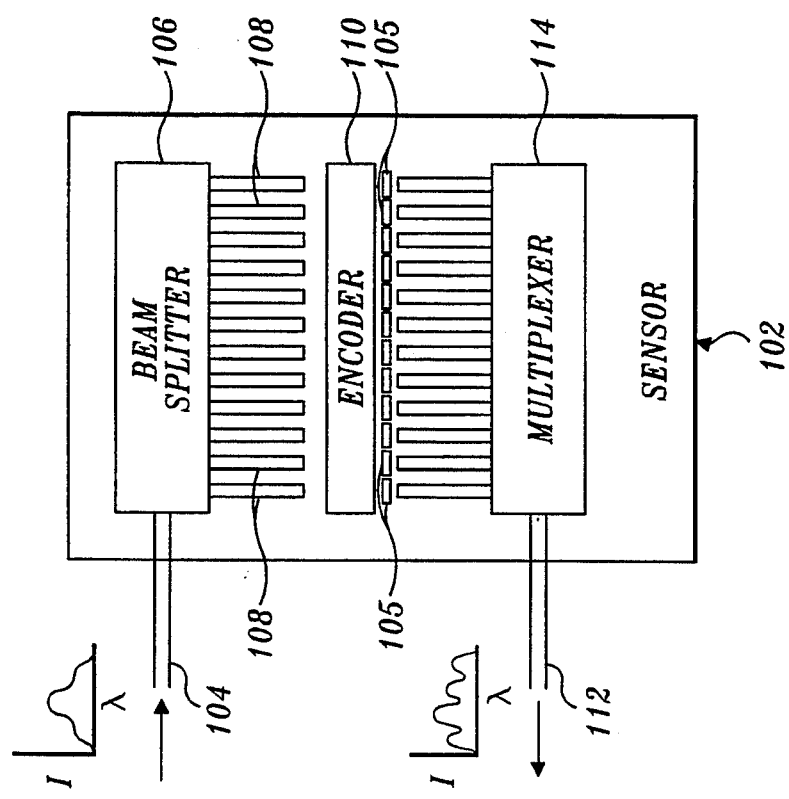
FIG. 15 is a schematic representation of an alternative wavelength division multiplexed (WDM) digital sensor that can be optically trimmed in accordance with this invention.
Figure 14:
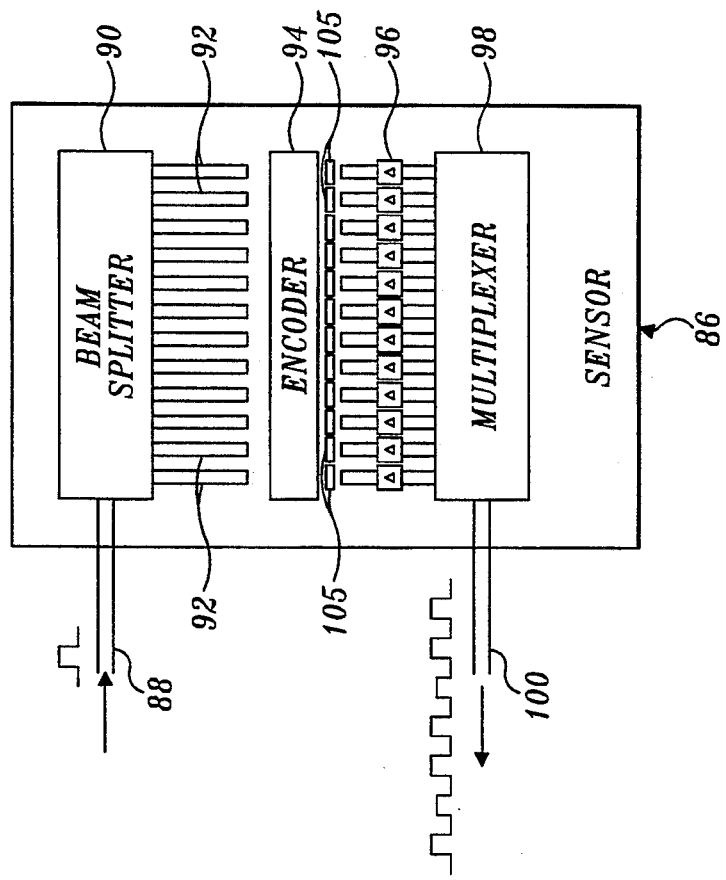
FIG. 14 is a schematic representation of an alternative time-domain multiplexed (TDM) digital sensor that can be optically trimmed in accordance with this invention.

A WEM sensor 102 is shown in FIG. 15 and is somewhat similar in construction to the sensor shown in FIG. 14. In that regard, sensor 102 receives a broad band beam of optical radiation along an input fiber 104. This optical beam is divided into n discrete wavelength components by an n-way filter or wavelength division multiplexer 106, which may include n different wavelength selective elements. The resultant discrete wavelength beams traverse n optical paths 108, formed, for example, by fibers or waveguides and defining the various channels of sensor 102. The beam traversing each channel 108 is modulated by an encoder 110, before being multiplexed back onto a single output fiber 112 by a multiplexer 114.

The output transmitted by fiber 112 is thus a beam that includes n different spectral components. This output is converted to electrical signals by n photodiodes or charge-coupled devices. The electrical signals are then evaluated by a processing system 12, which compares each wavelength component against some threshold level. Because variations in optical losses from channel-to-channel and from sensor-to-sensor may alter the way in which a certain wavelength component is interpreted, some compensation is necessary. This can be accomplished by electrically trimming the processing system 12 to use different thresholds, but the sensors will no longer be interchangeable. In the preferred arrangement, however, the different channels may be optically trimmed in any of the various manners described above, including, for example, with filters 105.

In summary, optical trimming allows optical sensors to be interchanged with a minimum of sensor complexity and minimum of post-construction processing. Optical trimming also allows the multiple channels of a single digital sensor to be uniformly interpreted. The devices used to accomplish the optical trimming are simple and inexpensive to make and install.

Those skilled in the art will recognize that the embodiments of the invention disclosed herein are exemplary in nature and that various changes can be made therein without departing from the scope and the spirit of the invention. In this regard, and as was mentioned previously, optical trimming can be used in any of a wide variety of different kinds of optical sensors. Further, it will be recognized that the particular approaches described can be varied. For example, the transmissive trimming approach discussed above can be performed using filters with variable density dot patterns, sputtered patterns, or varying film thickness. Because of the above and numerous other variations and modifications that will occur to those skilled in the art, the following claims should not be limited to the embodiments illustrated and disclosed herein.

The embodiments of the invention in which an exclusive property or privilege is claimed are defined as follows:

1. A sensor for transmitting an optical beam as part of the production of an output indicative of a parameter said sensor is exposed to, said sensor comprising:
   transmission means for defining at least a first and a second optical transmission path for the optical beam within said sensor, said first and second optical transmission paths exposing the optical beam to differential losses that may influence the output of said sensor; and
   optical filter means, positionable in any of the first and the second optical transmission paths defined by said transmission means, for altering the optical characteristics of the optical transmission path in which the optical filter means is positioned to reduce the influence that the differential losses might have on the output of said sensor.

2. The sensor of claim 1, wherein said optical filter means comprises at least one variable filter for adjustably controlling the losses of the transmission path.

3. The sensor of claim 2, wherein said filter comprises a first optical wedge element having a first transmissivity and a second optical wedge element having a second transmissivity, said first and second wedge elements varying in thickness and being secured together to produce a filter of uniform thickness and nonuniform transmissivity.

4. The sensor of claim 1, wherein said optical filter means comprises at least one region of nonuniform transmissivity.

5. The sensor of claim 4, wherein the position of said optical filter means relative to the transmission path is adjustable to control the transmissivity of said filter means the optical beam is exposed to and wherein said sensor further comprises means for securing said optical filter means relative to the transmission path.

6. The sensor of claim 4, wherein said optical filter means further comprises at least one region of uniform transmissivity.

7. A sensor for receiving an input optic beam including a first component and a second component and for producing an output indicative of a parameter of interest, said sensor comprising:
   first optical path means for defining a first optical path for the first component of the input beam;
   second optical path means for defining a second optical path for the second component of the input beam, at least a portion of said first and second optical paths being different, said first and second optical paths having optical losses associated therewith;
   modulation means, associated with said first optical path, for modulating the first component of the input beam with information regarding the parameter of interest; and
   compensation means for optically influencing at least one of the first and second optical paths to alter the optical losses associated therewith to some predetermined level that is sufficient to allow the output to be interpreted substantially uninfluenced by the losses.

8. The sensor of claim 7, wherein the first component is a modulated component having a first wavelength and the second component is a reference component having a second wavelength.

9. The sensor of claim 7, wherein the first optical path defines a first channel path and the first component represents a first time-division component included in the output, and wherein the second optical path defines a second channel and the second component represents a second time-division component included in the output.

10. The sensor of claim 7, wherein the first optical path defines a first channel path and the first component represents a first wavelength component of the output, and wherein the second optical path defines a second channel and the second component represents a second wavelength component of the output.

11. The sensor of claim 7, wherein said compensation means comprises a variable optical filter included in one of the first and second optical paths.

12. The sensor of claim 7, wherein said compensation means comprises a variable reflective element included in one of the first and second optical paths.

13. The sensor of claim 7, wherein said compensation means comprises an adjustable blocking element positioned in one of the first and second optical paths.

14. The sensor of claim 7, wherein said compensation means is for adjusting at least one of the first and second optical path means.

15. A sensor for processing an input beam of radiation received along an input path to produce an indication of the position of a sensed object relative to a reference object, the input beam including a first component having a first wavelength and a second component having a second wavelength, said sensor comprising:
   filter means for separating the input beam into the first and second components;
   modulation means for modulating the first component of the input beam with information relating to the position of the sensed object relative to the reference object and producing first and second modulated output beams of radiation;
   separation means for separating the second component of the input beam into first and second reference output beams of radiation; and
   adjustment means for trimming at least one of the first modulated output beam, second modulated output beam, first reference beam and second reference beams of radiation.

16. The sensor of claim 15, wherein said modulation means comprises an encoder and modulation path mirror, the orientation of said encoder with respect to the first component of the input beam being representative of the position of the sensed object relative to the reference object, said encoder reflecting the first component of the input beam to produce the first modulated output beam of radiation and transmitting the first component of the input beam to produce the second modulated output beam of radiation, said modulation path mirror redirecting the second modulated output beam.

17. The sensor of claim 16, wherein said separation means comprises a beam splitter and reference path mirror, said beam splitter separating the second component of the input beam into the first and second reference output beams of radiation, said reference path mirror redirecting the second reference output beam.

18. The sensor of claim 17, wherein said filter means comprises an interference filter that transmits the first component of the input beam to said encoder and reflects the second component of the input beam to said beam splitter, said interference filter also transmitting the first modulated output beam and reflecting the first reference output beam along a first output beam path and transmitting the second modulated output beam and reflecting the second reference output beam along a second output beam path.

19. The sensor of claim 18, wherein said adjustment means comprises means for adjusting the relative intensity of the first and second modulated beams.

20. The sensor of claim 19, wherein said adjustment means comprises a first optical filter, positioned between said encoder and said interference filter, for adjusting the intensity of the first modulated beam and a second optical filter, positioned between said modulated path mirror and said interference filter, for adjusting the intensity of the second modulated beam.

21. The sensor of claim 15, wherein said adjustment means comprises means for adjusting the intensity of the first and second reference beams.

22. The sensor of claim 21, wherein said adjustment means comprises a first variable optical filter, positioned between said beam splitter and said interference filter for adjusting the intensity of the first reference beam, and a second optical filter, positioned between said reference path mirror and said interference filter, for adjusting the intensity of the second reference beam.

23. The sensor of claim 15, wherein said adjustment means comprises means for adjusting the intensity of the first modulated output and first reference output beams and for adjusting the intensity of the second modulated output and second reference output beams.

24. The sensor of claim 23, wherein said adjustment means comprises a first wavelength-selective optical filter, positioned along said first output beam path, and a second wavelength-selective optical filter, positioned along said second output beam path.

25. A system of sensors designed to be interchangeably used in an environment to monitor a parameter of interest, said system comprising:
a plurality of sensor elements, each said sensor element being for transmitting an optical beam and producing an output in response to the parameter of interest; and
compensation means, coupled to each said sensor element, for adjusting the transmission of the optical beam by the sensor element to allow different ones of said sensor elements to be interchangeably used in the environment without introducing a variation in the output of the sensor element that is independent of the parameter of interest.

26. A method of compensating sensors for interchangeable use in an environment, each said sensor producing an output representative of a parameter of interest in response to an optic beam transmitted by the sensor, each sensor having a particular construction, said method comprising the steps of:
determining the extent to which the particular construction of a sensor influences the output of the sensor, independent of the parameter of interest; and
adjusting the way in which the optic beam is transmitted by the sensor to reduce the extent to which the particular construction of the sensor influences the output of the sensor and make the sensor more readily interchangeable.

27. The method of claim 26, wherein said step of adjusting comprises the steps of:
inserting a filter having a nonuniform transmissivity into the path of the optic beam;
adjusting the position of the filter relative to the optical beam to control the transmissivity of the portion of the filter traversed by the beam; and
fixing the position of the filter once the desired relative position of the filter and optical beam is achieved.

* * * * *

UNITED STATES PATENT AND TRADEMARK OFFICE
CERTIFICATE OF CORRECTION

PATENT NO. : 5,345,076
DATED : September 6, 1994
INVENTOR(S) : M.C. Reddy

It is certified that error appears in the above-indentified patent and that said Letters Patent is hereby corrected as shown below:

| COLUMN | LINE | |
|---|---|---|
| [54] (Title) | 3 | "DIFFERENTIAL NODE LOSSES" should read --DIFFERENTIAL MODE LOSSES-- |
| [56] (Pg. 1) | Refs. Cited (U.S. Pat Docs) | "Huggins" should read --Huggins et al.-- |
| 3 | 37 | "an" should read --art-- |
| 12 | 45 | "minor 84" should read --mirror 84-- |
| 14 | 31 | "WEM" should read --WDM-- |

Signed and Sealed this

Twenty-fourth Day of January, 1995

Attest:

BRUCE LEHMAN

Attesting Officer    Commissioner of Patents and Trademarks